Dec. 19, 1939.     D. W. SIEBERT ET AL     2,184,154
RUNNING GEAR FOR BABY CARRIAGES
Filed Dec. 17, 1938     2 Sheets-Sheet 1
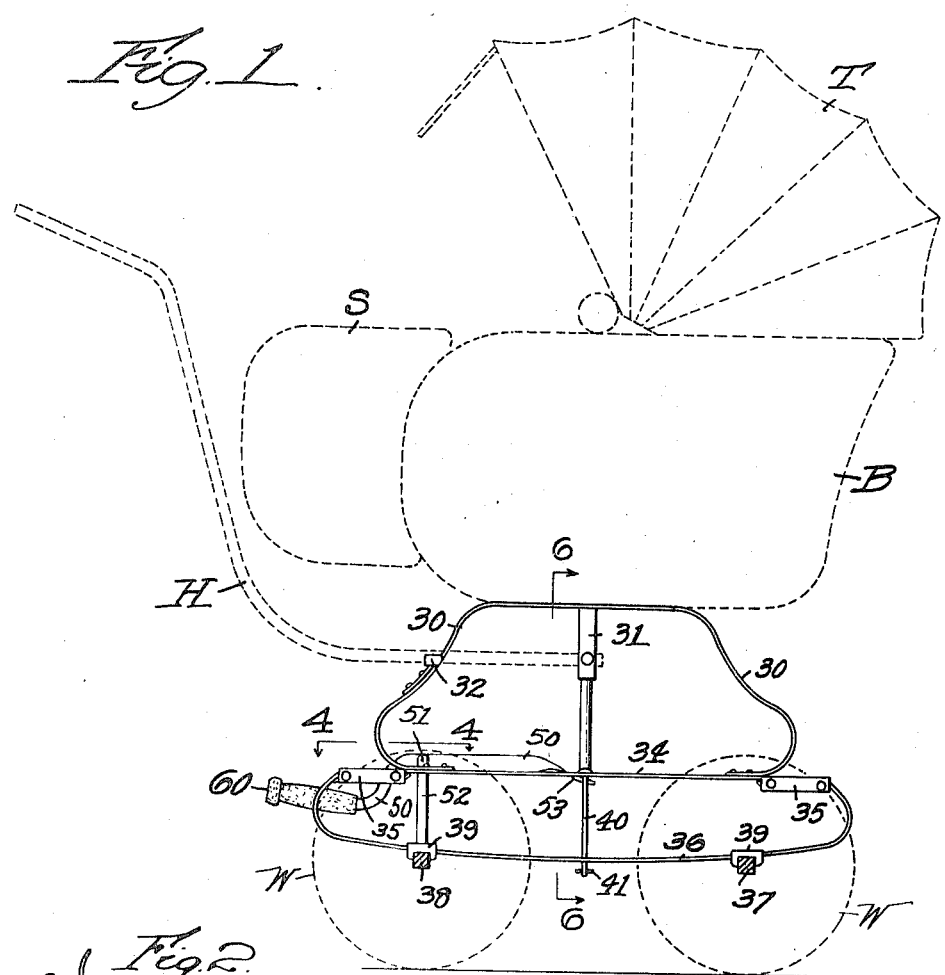
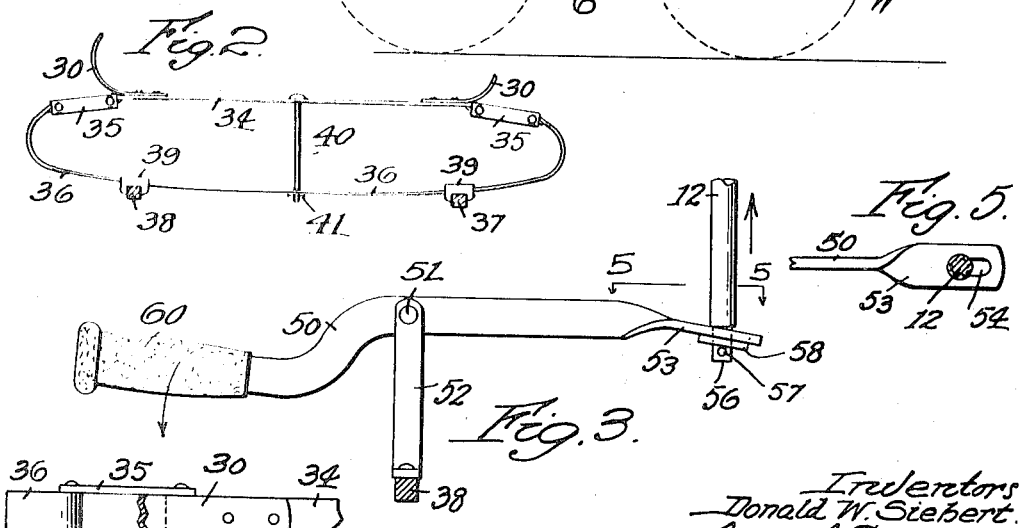
Inventors
Donald W. Siebert
Aaron A. Greenwood
Allan Lindquist Dec. 19, 1939.   D. W. SIEBERT ET AL   2,184,154
RUNNING GEAR FOR BABY CARRIAGES
Filed Dec. 17, 1938   2 Sheets-Sheet 2
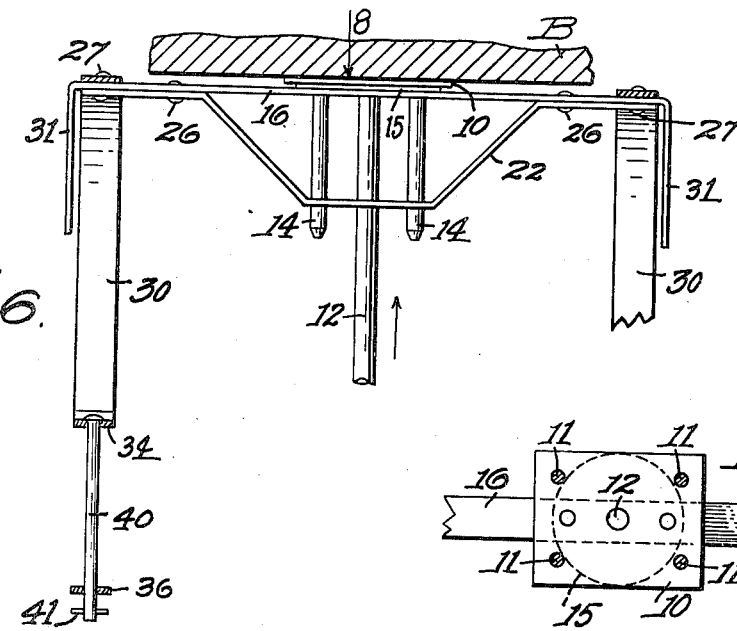
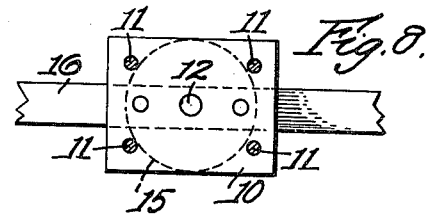
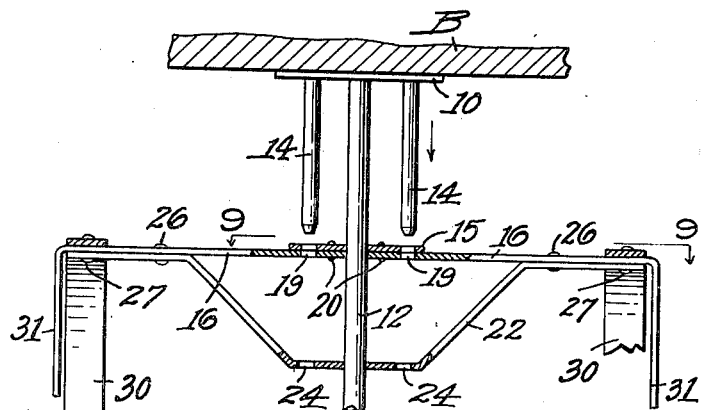
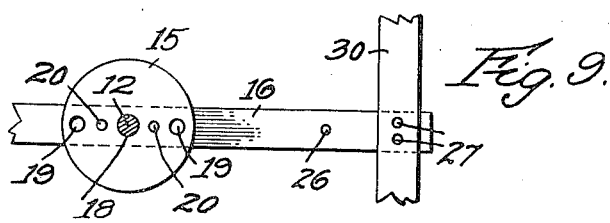
Inventors
Donald W. Siebert
Aaron A. Greenwood
Allan Lindquist Patented Dec. 19, 1939

2,184,154

UNITED STATES PATENT OFFICE 2,184,154

RUNNING GEAR FOR BABY CARRIAGES

Donald W. Siebert, Aaron A. Greenwood, and Allan Lindquist, Gardner, Mass., assignors to O. W. Siebert Company, Gardner, Mass., a corporation of Massachusetts Application December 17, 1938, Serial No. 246,377

3 Claims. (Cl. 280—47)

This invention relates to baby carriages of the general type in which the body is a structural unit which is separately and reversibly mounted on the running gear.

It is the general object of our invention to provide an improved construction in running gear which permits the body of such a baby carriage to be quickly and easily raised and reversed, and which holds the body securely in either a forwardly-facing or a rearwardly-facing position.

Important features of the invention also relate to the provision of an improved shackle link suspension for a reversible baby carriage body, and to means for limiting relative movement of different parts of the spring suspension during raising of the carriage body for reversal.

Our invention further relates to arrangements and combinations of parts which will be hereinafter described and more particularly pointed out in the appended claims.

A preferred form of the invention is shown in the drawings, in which

Fig. 1 is a side elevation of a baby carriage, with portions of the running gear shown in section;

Fig. 2 is a side elevation of certain parts shown in Fig. 1, with some of said parts in a different position;

Fig. 3 is an enlarged side elevation of parts of a body-elevating device;

Fig. 4 is a detail sectional plan view, taken along the line 4—4 in Fig. 1;

Fig. 5 is a detail sectional plan view, taken along the line 5—5 in Fig. 3;

Fig. 6 is a partial transverse sectional elevation, taken along the line 6—6 in Fig. 1;

Fig. 7 is a view similar to Fig. 6 but showing certain parts in a different position;

Fig. 8 is a detail plan view, looking in the direction of the arrow 8 in Fig. 6; and Fig. 9 is a detail sectional view, taken along the line 9—9 in Fig. 7.

Referring to the drawings, we have shown our invention embodied in a baby carriage of the so-called "stroller" type and having a body B, top T, pivoted foot support S, handles H and wheels W, all of the usual construction.

Provision is made for holding the support S in either raised or lowered position relative to the body B but when the body B is to be reversed, the support S must be raised.

The body B has a plate 10 (Figs. 7 and 8) firmly secured to the under side thereof, as by screws or rivets 11, and the plate 10 has a lifter rod 12 and a pair of locking pins 14 extending downwardly therefrom and riveted or otherwise permanently fixed therein. The rod 12 and pins 14 normally extend down through a plate 15 fixed on a cross bar 16. Holes 18 and 19 (Fig. 9) are provided to receive the post 12 and rods 14 respectively, and the parts 15 and 16 are secured together, preferably by rivets 20.

The lifter rod 12 also extends downwardly through a depending brace member 22, and the locking pins 14 extend through holes 24 (Fig. 7) in the brace member 22 when the body B is in lowered or normal position.

The brace member 22 is riveted at 26 to the cross bar 16, and the cross bar and brace member are both riveted at 27 to arched upper springs 30.

The outer ends of the cross bar 16 are extended downward as indicated at 31 (Figs. 1 and 7) for attachment of the ends of the handle H thereto. Offset brackets 32 (Fig. 1) are mounted on the springs 30 and support the handles H at additional points.

The lower ends of the arched springs 30 are riveted to the ends of longitudinal bars 34, and the front and rear ends of these bars 34 are in turn connected by shackle links 35 to the upturned ends of lower springs 36.

The lower springs 36 rest upon the front and rear axles 37 and 38 and are secured thereto by clips 39. Headed tie rods 40 are loosely inserted in vertically aligned holes in the longitudinal bars 34 and lower springs 36, and a cross pin 41 in each tie rod is normally spaced substantially below its lower spring 36, as shown in Fig. 1.

A foot lever 50 (Fig. 3) is pivoted at 51 on a bracket 52, which in turn is mounted on the rear axle 38. The forward end of the lever 50 is twisted 90°, as indicated at 53, and is provided with an elongated slot 54 (Fig. 5) to receive the reduced lower end 56 of the lifter rod 12. These parts are loosely secured in assembled relation by a cross-pin 57 and washer 58 (Fig. 3).

The parts are shown in Figs. 1 and 6 in normal operating condition, with the carriage B supported on and by the upper springs 30 and locked in one or the other of its reverse positions by the locking pins 14.

When it is desired to reverse the body B, the operator presses downward on the rear end of the lever 50, which may be provided with a rubber sleeve or casing 60, as indicated in Fig. 3. The lifter rod 12 is thus elevated, moving the body B and locking pins 14 upward to the position shown in Fig. 7, with the pins 14 out of the holes in the cross bar 16.

The load in the body B is usually unbalanced, however, thus producing sufficient friction drag on the lifter rod 12 and locking pins 14 so that the entire upper part of the supporting structure, including the upper springs 30, longitudinal bars 34, cross bar 16 and brace 22, all tends to move upward with the lifter rod 12, such upward movement being permitted within rather wide limits by the shackle suspension of the bars 34. As a result of such free upward movement of the supporting structure, normal depression of the lever 50 might fail to release the locking pins 14 from the cross bar 16 as shown in Fig. 7.

To prevent this undesirable result, we provide the tie rods 40 previously described. When the structure supported by the shackles 35 starts to move upward, said structure quickly assumes the position shown in Fig. 2, with the bars 34 rigidly connected to the lower springs 36 by the tie-rods 40 and cross pins 41. Further upward movement due to friction drag on the lifter rod 12 and locking pins 14 is then effectively prevented.

The body B, when raised to the position shown in Fig. 7, may be quickly and easily rotated and reversed. During such rotation, pressure on the lever 50 may be released, so that the locking pins will slide around on the disc or plate 15 until they are aligned with the holes 19, into which they then drop.

We have thus provided a very simple and effective construction in which a reversible baby carriage body is mounted on a yieldable supporting structure with shackle link suspension, while at the same time the disadvantage of free upward movement of parts of the supporting structure by friction drag is effectively avoided.

Having thus described our invention and the advantages thereof, we do not wish to be limited to the details herein disclosed, otherwise than as set forth in the claims, but what we claim is:

1. Running gear for a baby carriage having a reversibly mounted body comprising a yieldable supporting structure for said body, shackle links for said supporting structure, members supporting said links, manual means positively connected to said members and effective to raise said body for reversal, and means to limit upward movement of said supporting structure with said carriage body when said body is raised but leaving said supporting structure normally free to rock on said link suspension.

2. Running gear for a baby carriage having a reversibly mounted body comprising a lifting device on which said body is mounted for vertical and rotational movements, manual means to elevate said body, a yieldable supporting structure for said body, a shackle link suspension for said supporting structure including lower springs with spaced upturned ends to which the shackle links are connected, said manual elevating means being mounted on a part which supports said lower springs, and means to limit free upward movement of said supporting structure relative to said lower springs when said carriage is raised for reversal but leaving said supporting structure normally free to rock on said link suspension.

3. Running gear for a baby carriage having a reversibly mounted body comprising a lifting device on which said body is mounted for vertical and rotational movements, manual means to elevate said body, and supporting structure for said body including arched upper springs having their lower ends connected by longitudinal bars, lower springs having spaced up-turned ends, shackle links connecting the ends of said longitudinal bars to the ends of said lower springs, said manual elevating means being mounted on a part which supports said lower springs, and tie rods limiting relative vertical movement between said longitudinal bars and said lower springs as said carriage body is raised but leaving said supporting structure normally free to rock on said link suspension.

DONALD W. SIEBERT.
AARON A. GREENWOOD.
ALLAN LINDQUIST.